(12) United States Patent
Nakamura

(10) Patent No.: US 9,183,469 B2
(45) Date of Patent: Nov. 10, 2015

(54) COMMODITY SALES DATA PROCESSING APPARATUS AND CONTROL METHOD

(71) Applicant: TOSHIBA TEC KABUSHIKI KAISHA, Shinagawa-ku, Tokyo (JP)

(72) Inventor: Takahiro Nakamura, Izunokuni (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/331,454

(22) Filed: Jul. 15, 2014

(65) Prior Publication Data

US 2015/0022855 A1    Jan. 22, 2015

(30) Foreign Application Priority Data

Jul. 16, 2013   (JP) ................... 2013-147861

(51) Int. Cl.
 *G06K 15/00* (2006.01)
 *B41J 3/46* (2006.01)
(52) U.S. Cl.
 CPC ...... *G06K 15/005* (2013.01); *B41J 3/46* (2013.01)
(58) Field of Classification Search
 CPC .................. G06K 15/1848; G06K 15/005
 USPC ..................... 358/1.14, 1.15; 710/303
 See application file for complete search history.

(56) References Cited

U.S. PATENT DOCUMENTS

| 2005/0146741 | A1* | 7/2005 | Collier et al. ............... 358/1.15 |
| 2010/0020349 | A1* | 1/2010 | Carroll ......................... 358/1.15 |
| 2012/0137038 | A1* | 5/2012 | Huang et al. .................. 710/303 |
| 2014/0087686 | A1* | 3/2014 | Lee ............................ 455/404.2 |

FOREIGN PATENT DOCUMENTS

| JP | 2004-013708 | 1/2004 |
| JP | 2012-252605 | 12/2012 |

* cited by examiner

*Primary Examiner* — Jacky X Zheng
(74) *Attorney, Agent, or Firm* — Amin, Turocy & Watson, LLP

(57) ABSTRACT

A commodity sales data processing apparatus comprises a stationary type docking station provided with a printer and a portable information terminal which is freely mounted on or separated from the docking station. The information terminal accepts the input of the data related to the sales of a commodity and processes the accepted data. Further, if a print job is designated, the information terminal, when mounted on the docking station, prints printing data using the printer of the docking station or stores the printing data when not mounted on the docking station. Moreover, the stored printing data is printed using the printer of the docking station when the information terminal is mounted on the docking station.

10 Claims, 5 Drawing Sheets

PRINTING DATA TABLE

| TERMINAL | PRINTING CODE | DATE AND TIME | JOB NAME | DATA |
|---|---|---|---|---|
| X1 | P01 | 2013.01.01 08:05:11 | CHECKOUT | D1 |
| | P02 | 2013.01.01 08:07:12 | STOCK MANAGEMENT | D2 |
| | P03 | 2013.01.02 09:05:03 | ORDER RECEPTION | D3 |
| | P04 | 2013.01.02 11:12:45 | SALES REGISTRATION | D4 |
| | P05 | 2013.01.02 15:07:28 | COMMODITY RETURN REGISTRATION | D5 |
| | P06 | 2013.01.03 09:25:31 | LABEL ISSUING | D6 |
| | P07 | 2013.01.03 12:05:52 | COUPON ISSUING | D7 |
| | P08 | 2013.01.03 14:28:04 | CHECKOUT | D8 |

COMMODITY SALES DATA PROCESSING APPARATUS AND CONTROL METHOD

CROSS-REFERENCE TO RELATED APPLICATION

This application is based upon and claims the benefit of priority from Japanese Patent Application No. 2013-147861, filed Jul. 16, 2013, the entire contents of which are incorporated herein by reference.

FIELD

Embodiments described herein relate to a commodity sales data processing apparatus comprising a portable information terminal and a control method.

BACKGROUND

It is known a commodity sales data processing apparatus, such as a POS (Point Of Sales) terminal, which reads the data of the commodity brought to a checkout counter by a customer and processes the reading data as commodity sales data.

The POS terminal which is a stationary type one is arranged at the checkout counter of a store.

On the other hand, a portable information terminal, such as a tablet type information terminal, the display screen of which is capable of being touched by a user with fingers to input information, is significantly popularized and reduced in price.

When used as a POS terminal, such an information terminal is frequently required to print data.

In a case where a print job is needed, a shop clerk goes to the management room in a store to connect the information terminal with a printer arranged in the management room to print data. When the printer in the management room is connected with a communication network, the shop clerk sends the printing data of the information terminal to the printer via the communication network and then prints the data using the printer.

The work to connect an information terminal with a printer each time is a burden for the shop clerk, and also reduces work efficiency.

In a case where a print job is performed via a communication network, there is no need to connect an information terminal to a printer. On the other hand, it is necessary to set a condition for the selection of a printer from a plurality of printers, which is also a burden for the shop clerk. If the printed data is important, the content on a printed paper may be leaked to a third party during the period when the shop clerk goes to the place where the printer is arranged. It also occasionally happens that the shop clerk forgets that the print job is completed, left the printed paper placed on the printer.

DETAILED DESCRIPTION

In accordance with one embodiment, a commodity sales data processing apparatus comprises a stationary type docking station provided with a printer and a portable information terminal which is freely mounted on or separated from the docking station. The information terminal accepts the input of the data related to the sales of a commodity and processes the accepted data. Further, if a print job is designated, the information terminal, when mounted on the docking station, prints printing data using the printer of the docking station or stores the printing data when not mounted on the docking station. Moreover, the stored printing data is printed by the printer of the docking station when the information terminal is mounted on the docking station.

An embodiment of the commodity sales data processing apparatus is described below with reference to the accompanying drawings. Further, a commodity sales data processing apparatus which achieves the functions of a POS terminal using a tablet information terminal is exemplified in the present embodiment.

Figure 1:
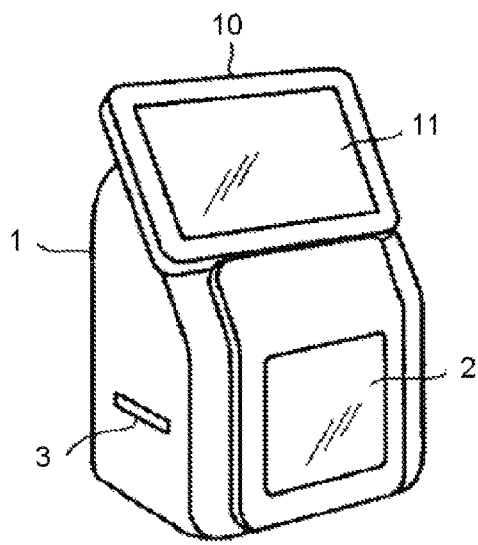
FIG. 1 is a diagram illustrating the appearance of a docking station and a tablet terminal according to an embodiment.
Figure 2:
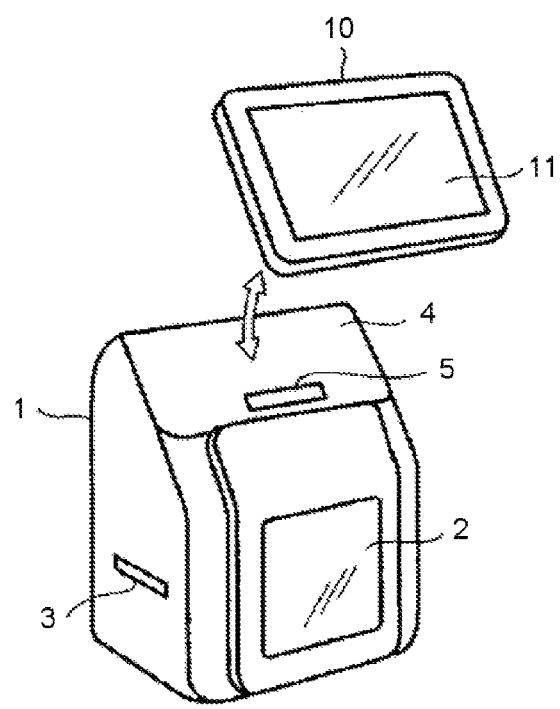
FIG. 2 is a diagram illustrating a state in which a tablet terminal is separated from a docking station according to an embodiment.

In FIG. 1, reference numeral 1 denotes a stationary type docking station which is arranged at the checkout counter of a store, and reference numeral 10 denotes an information terminal, for example, a tablet type information terminal (hereinafter referred to as a tablet terminal for short), which can be freely mounted on or separated from the docking station 1. FIG. 1 shows a state in which the tablet terminal 10 is mounted on the docking station 1, and FIG. 2 shows a state in which the tablet terminal 10 is separated from the docking station 1.

That is, the docking station 1 has a box-shaped casing on the upper portion of which the tablet terminal 10 is mounted (placed), a reading window 2 for a scanner is arranged on the front side of the casing, and a paper issuing opening 3 is arranged on the left lateral side of the casing. When the tablet terminal 10 is lifted and separated from the docking station 1, as shown in FIG. 2, an inclined terminal mounting section 4 appears on the upper portion of the casing of the docking station 1, and an extension connector 5 arranged on the terminal amounting section 4 is exposed.

The tablet terminal 10 has a rectangular casing which can be held by a user with one hand, a touch panel display section 11 which can be touched to operate with fingers is arranged on the cashing, and a docking connector 68 which will be described later is arranged on the back of the casing. The back side of the tablet terminal 10 is placed on the terminal mounting section 4 of the docking station 1 while the docking connector 68 is fit in the extension connector 5, thereby completing the electrical connection between the tablet terminal 10 and the docking station 1. The connection can be easily released by lifting the tablet terminal 10 to separate the tablet terminal 10 from the terminal mounting section 4.

Figure 3:
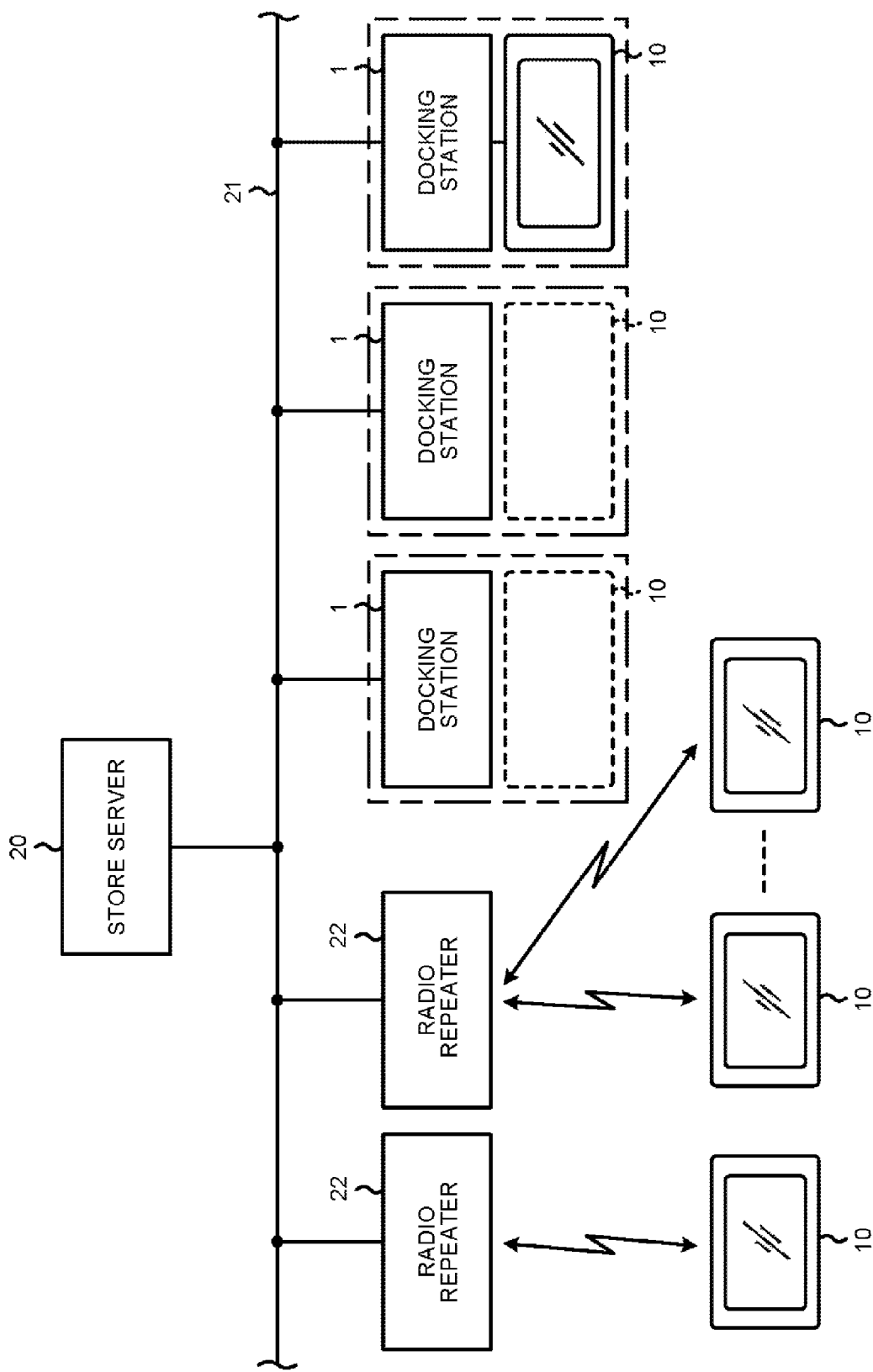
FIG. 3 is a schematic configuration diagram of a POS system according to an embodiment.

The commodity sales data processing apparatus consists of a docking station 1 and a tablet terminal 10. FIG. 3 schematically illustrates a POS system using the commodity sales data processing apparatus.

The POS system comprises a plurality of commodity sales data processing apparatuses and a store server 20 for unitarily managing these commodity sales data processing apparatuses. The docking station 1 of each commodity sales data processing apparatus is connected with the store server 20 via a communication network 21 such as a LAN (Local Area Network) to be capable of carrying out the bidirectional communication with each other freely. Further, through the communication network 21 and one or more radio repeaters 22 connected with the communication network 21, the tablet terminal 10 of each commodity sales data processing apparatus is connected with the store server 20 to be capable of carrying out the bidirectional communication with each other freely. Both when mounted on the docking station 1 and when separated from the docking station 1, the tablet terminal 10 is capable of achieving the functions of a POS terminal.

When applied in a store, a tablet terminal 10 is held by each shop clerk. When doing his/her job as a cashier at a checkout counter, the shop clerk mounts the held tablet terminal 10 on the docking station 1 on the checkout counter and then carries out the same settlement according to the display of the touch panel display section 11 of the tablet terminal 10 as the shop assistant does using a general POS terminal.

Figure 4:
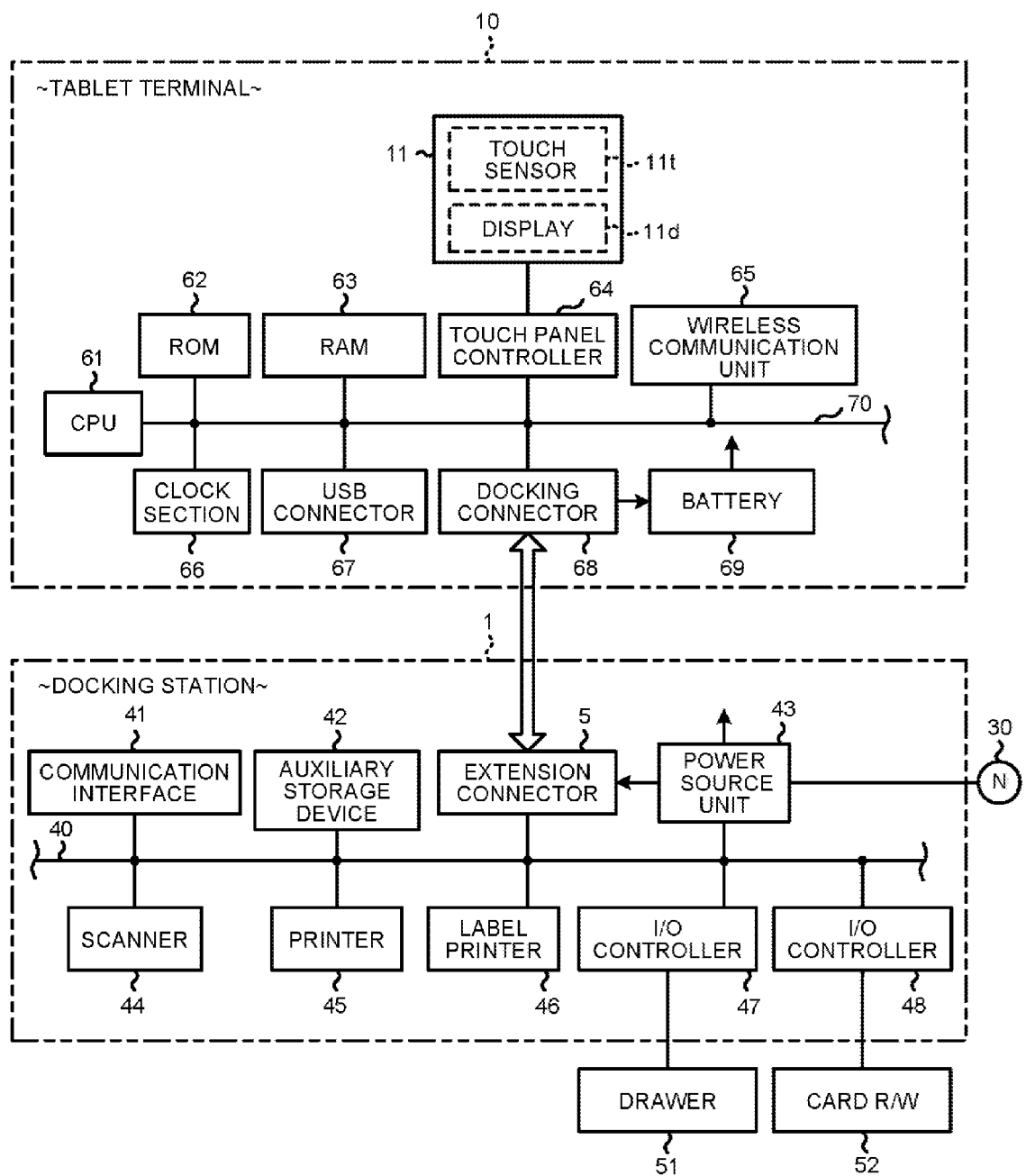
FIG. 4 is a block diagram illustrating the main portion of a docking station and a tablet terminal according to an embodiment.

FIG. 4 illustrates the main portions of the docking station 1 and the tablet terminal 10.

In addition to the extension connector 5, a communication interface 41, an auxiliary storage device (storage module) 42, a power supply unit 43, a scanner 44, a printer (first printer) 45, a label printer (second printer) 46 and I/O controllers 47 and 48 are also at least carried on the docking station 1. The communication interface 41, the auxiliary storage device 42, the power supply unit 43, the scanner 44, the printer 45, the label printer 46 and the I/O controllers 47 and 48 are connected with each other via a bus line 40 such as an address bus line, a data bus line and the like.

The communication interface 41 is connected with the communication network 21. The communication interface 41 takes charge of the data transmission/reception between the tablet terminal 10 and the store server 20 via the communication network 21.

The auxiliary storage device 42 which is the auxiliary storage part of a computer is, for example, an EEPROM (Electric Erasable Programmable Read-only Memory), a HDD (Hard Disk Drive) or a SSD (Solid State Drive) and the like. The auxiliary storage device 42 stores the data used in various processing executed by a CPU 61 of the tablet terminal 10 and the data generated in the processing by the CPU 61. As occasion demands, the auxiliary storage device 42 also stores an application program.

The power supply unit 43 converts the voltage of a commercial AC power supply 30 into the operating voltage of the docking station 1, outputs the operating voltage as well as a charging voltage for the tablet terminal 10. The charging voltage is supplied to the tablet terminal 10 via the extension connector 5.

A scanner 44 optically reads a barcode held to the reading window 2. The scanner 44 may read the barcode attached to a commodity from the image of the commodity captured by a camera.

The printer 45 is provided with roll paper for receipt or journal and carries out, for example, a thermal printing on the roll paper. The label printer 46 is provided with rolled label paper and carries out, for example, a thermal printing on the roll paper. The printed paper is discharged from the paper issuing opening 3 while being cut off at a given length.

The I/O controller 47 controls a device, for example, a drawer 51, externally connected with the back or a lateral side of the casing of the docking station 1. The I/O controller 48 controls a device, for example, a card reader-writer 52, externally connected with the back or a lateral side of the casing of the docking station 1. The card reader-writer 52 is capable of reading data from or writing data into an electronic money card.

On the other hand, the tablet terminal 10 comprises a CPU (Central Processing Unit) 61, a ROM (Read Only Memory) 62, a RAM (Random Access Memory) 63, a touch panel controller 64, a wireless communication unit 65, a clock section 66, a USB (Universal Serial Bus) connector 67, a docking connector 68, a battery 69 and the like. The CPU 61 is connected with the ROM 62, the RAM 63, the touch panel controller 64, the wireless communication unit 65, the clock section 66, the USB connector 67 and the docking connector 68 via a bus line 70 such as an address bus line, a data bus line and the like.

The CPU 61 which is the central part of a computer controls each section according to an operating system or an application program to realize various functions as a POS terminal.

The ROM 62 which is the main storage part of the computer stores the aforementioned operating system or application program. As occasion demands, the ROM 62 further stores the data needed by the CPU 61 to execute various processing.

The RAM 63 which is the main storage part of the computer stores the data needed by the CPU 61 to execute various processing, if needed. In addition, the RAM 63 is also used as a work area for the CPU 61 to execute various processing.

The touch panel display section 11 is constituted to arrange a touch sensor 11*t* serving as an input section on the display part of a display 11*d*. The touch panel controller 64 connected with the touch panel display section 11 controls the screen display of the display 11*d* and while monitoring the signal of the touch sensor 11*t*. Moreover, the touch panel controller 64 detects input data according to the touched position coordinate information and the screen information of the display 11*d* at the time of the touch operation.

The wireless communication unit 65 sends or receives data to or from the radio repeater 22 through wireless communication. The clock section 66 clocks the current date and time.

The USB connector 67 is a connector for freely detachably connecting various USB devices having communication systems conforming to the USB standard. The drawer 51 or the card reader-writer 52 may be connected with the USB connector 67.

The docking connector 68, which is used to connect the tablet terminal 10 with the docking station 1, is arranged on the back of the casing of the tablet terminal 10.

The battery 69 outputs the operating voltage of the tablet terminal 10 so that the tablet terminal 10, when mounted on the docking station 1, is charged with the charging voltage supplied via the extension connector 5 and the docking connector 68 from the docking station 1.

Moreover, as main functions based on the control program in the ROM 62, the CPU 61 has the following modules (1)-(7):

(1) an input module which accepts the touch operation of a finger and the like on the display screen of the touch panel display section 11 and the reading data of the scanner 44 in the docking station 1 as data relating to the sales of a commodity.

(2) a processing module which processes the input data accepted by the input module as commodity sales data.

(3) a detection module which detects the mounting or the separation of the tablet terminal 10 on or from the docking station 1. Specifically, the detection module sends a confirmation signal via the docking connector 68, determines that the tablet terminal 10 is mounted on the docking station if the confirmation signal is returned to the docking connector 68 or determines that the tablet terminal 10 is separated from the docking station 1 if the confirmation signal is not returned to the docking connector 68.

(4) a first control module which, when a print job is designated by touching the touch panel display section 11 during the processing process of the foregoing processing module, prints the printing data (processed data) in the RAM 63 with either the printer 45 and the label printer 46 if the detection result of the detection module is that the tablet terminal 10 is mounted on the docking station 1 or sequentially stores the printing data in the RAM 63 in a printing data table in the RAM 63 if the detection result of the detection module is that the tablet terminal 10 is not mounted on the docking station 1.

(5) a determination module which determines whether or not printing data is stored in the printing data table in the RAM 63 at the moment (mounting moment) the mounting of the tablet terminal 10 on the docking station 1 is detected by the detection module.

(6) a notification module which notifies the effect that the printing data exists by displaying the effect on the touch panel display section 11 if the determination result of the determination module is that the stored printing data exists and notifies the effect that the printing data exists again by displaying the effect on the touch panel display section 11 if no print job is designated by touching the touch panel display section 11 as a response to the notification after the processing of the processing module is ended.

(7) a second control module which prints each printing data stored in the printing data table in the RAM 63 with either the printer 45 or the label printer 46 when a print job is designated by touching the touch panel display section 11 as a response to the notification of the notification module. Specifically, the second control module sequentially selects either the printer 45 or the label printer 46 according to the content of each printing data in the printing data table and sequentially prints the printing data in the printing data table using the selected printer.

Figure 5:
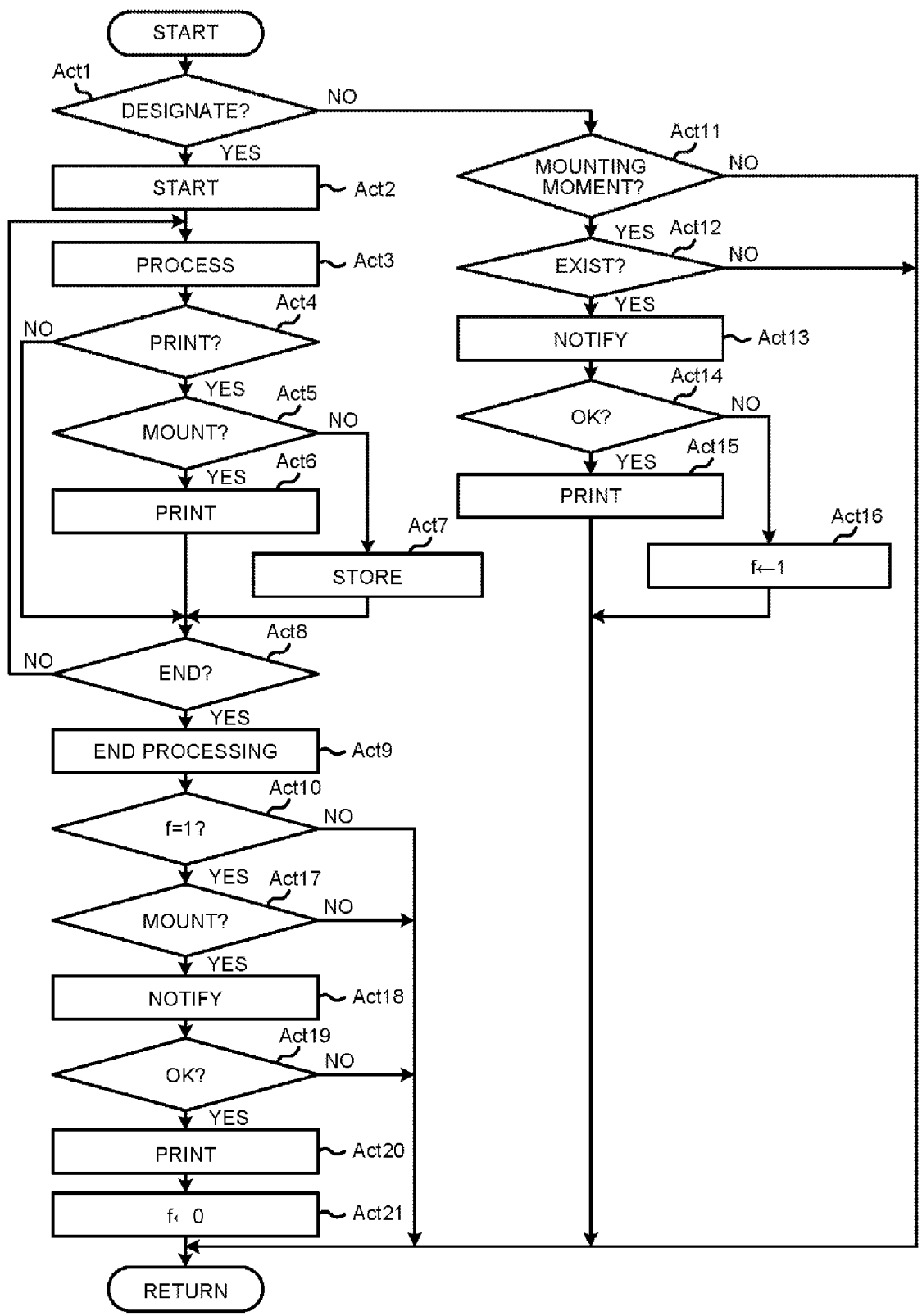
FIG. 5 is a flowchart illustrating the control executed by the CPU of a tablet terminal according to an embodiment.

Next, the control executed by the CPU 61 of the tablet terminal 10 is described with reference to the flowchart shown in FIG. 5.

The CPU 61 monitors the designation of a job on the initial screen of the touch panel display section 11 (ACT 1). If a job is designated by touching the initial screen (YES in ACT 1), the CPU 61 starts an application program corresponding to the designated job (ACT 2) and executes a processing based on the application program (ACT 3).

If a print job is designated in the processing (YES in ACT 4), the CPU 61 prints the printing data (processed data) in the RAM 63 using either the printer 45 or the label printer 46 (ACT 6) on condition that the tablet terminal 10 is mounted on the docking station 1 (YES in ACT 5).

In this case, if the content of the printing data in the RAM 63 corresponds to a label issuing job, then the CPU 61 selects the label printer 46. A label on which the name of a commodity, a two-dimensional code for recognizing a commodity and the like is recorded is issued through the printing of the label printer 46.

For example, if the content of the printing data in the RAM 63 corresponds to, such as a checkout job, a stock management job, an order reception job, a sales registration job, a commodity return registration job and a coupon issuing job other than the label issuing job, then the CPU 61 selects the printer 45. A receipt is issued through the printing of the printer 45 if the content of the printing data in the RAM 63 corresponds to a checkout job. A stock list table is issued if the content of the printing data in the RAM 63 corresponds to a stock management job. Order receiving paper (also referred to as order paper) is issued if the content of the printing data in the RAM 63 corresponds to an order reception job. A journal is issued if the content of the printing data in the RAM 63 corresponds to a sales registration job. A commodity return list table is issued if the content of the printing data in the RAM 63 corresponds to a commodity return registration job. A coupon ticket of a discount or preferential treatment is issued if the content of the printing data in the RAM 63 corresponds to a coupon job carried out when a customer desires for the issuing of a coupon or a coupon is distributed to a customer completing a commodity checkout. Further, the CPU 61 erases the printing data in the RAM 63 after the print job is ended.

On the other hand, if a print job is designated (YES in ACT 4) and the tablet terminal 10 is not mounted on the docking station 1 (NO in ACT 5), the CPU 61 stores the printing data (processed data) in the RAM 63 in the printing data table in the RAM 63 (ACT 7).

Figures 6, 7:
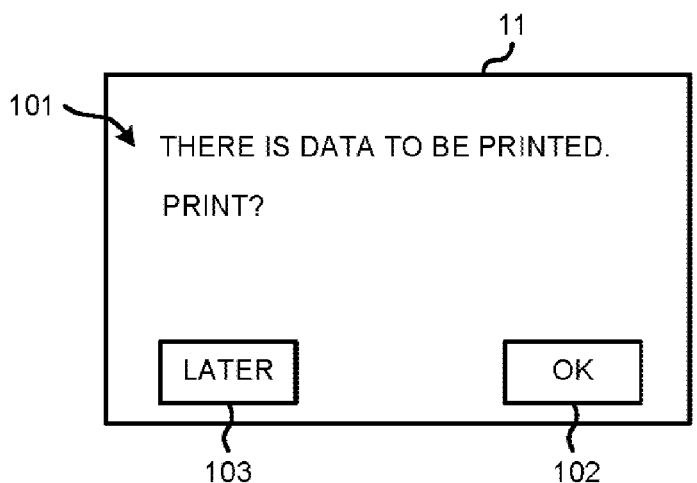
FIG. 6 is a diagram illustrating the content of a printing data table according to an embodiment.
FIG. 7 is a diagram illustrating the guidance screen of a tablet terminal according to an embodiment.

As shown in FIG. 6, the printing data table includes items 'terminal', 'printing code', 'date and time', 'job name' and 'data'. The terminal code, such as "X1", "X2", ..., "Xn" of the tablet terminal 10 executing a processing is input in the item 'terminal'. Printing code for identifying printing data is input in the item 'printing code' in a storage order. The date and time data of a processing is input in the item 'date and time'. A job name representing the job of the printing data is input in the item 'job name'. One or more printing data D1, D2, ... Dn is sequentially input in the item 'data'.

The CPU 61 ends the processing (ACT 9) if the touch operation (end operation) of the end key on the display screen of the touch panel display section 11 is performed (YES in ACT 8).

The CPU 61 confirms a print flag f (ACT 10) with the end processing. The flow returns to ACT 1 to monitor the designation of a job if the print flag f is not '1' (NO in ACT 10).

On the other hand, the shop clerk who performs an optional job with the tablet terminal 10 in hand while walking around in the store mounts the tablet terminal 10 in hand on the docking station 1 when returns to the checkout counter. The CPU 61 determines whether or not the stored printing data exists in the printing data table in the RAM 63 (ACT 12) at the mounting moment (NO in ACT 1, and YES in ACT 11).

If the stored printing data exists in the printing data table in the RAM 63 (YES in ACT 12), the CPU 61 notifies the effect that the printing data exists by displaying guidance words 101 "there is data to be printed, print?" on the touch panel display section 11 (ACT 13). In addition to the guidance words 101, a 'OK' key 102 and a 'later' key 103 for response are displayed in the guidance screen.

If the 'OK' key 102 in the guidance screen is touched (YES in ACT 14), the CPU 61 determines that the touch operation designates the execution of a print job and then sequentially prints each printing data in the printing data table in the RAM 63 using the printer 45 or the label printer 46 (ACT 15).

The CPU 61 returns to ACT 1 to monitor the designation of a job with the completion of the print job.

However, when the guidance screen in ACT 13 is displayed, a print job may be desired to be reserved when it is busy for a customer service and the like. In this case, the shop clerk touches the 'later' key 103 in the guidance screen. If the 'later' key 103 is touched (NO in ACT 14), the CPU 61 determines that the touch operation designates the reservation of a print job and then sets the print flag f to be "1" (ACT 16).

The CPU 61 confirms the print flag f with the end processing carried out in ACT 9 for the processing carried out in ACT 3 (ACT 10). When the print flag f is '1' (YES in ACT 10), the CPU 61 notifies the effect that the printing data exists again by displaying the guidance screen shown in FIG. 7 (ACT 18) on condition that the tablet terminal 10 is mounted on the docking station 1 (YES in ACT 17).

If the 'OK' key 102 in the guidance screen is touched (YES in ACT 19) as a response to the notification, the CPU 61 determines that the touch operation designates the execution of a print job and then sequentially prints the printing data in the printing data table in the RAM 63 using the printer 45 or the label printer 46 (ACT 20). The CPU 61 sets the print flag to be '0' during the print job (ACT 21). Further, the CPU 61 erases each printing data in the printing data table after the print job is ended.

In this way, printing data is sequentially stored in the tablet terminal 10 in advance when the tablet terminal 10 is not mounted on the docking station 1 and then sequentially printed by the docking station when the tablet terminal 10 is mounted on the docking station 1, thus, it is not needed to connect the tablet terminal 10 with a printer in the management room and the like every time printing data is generated, which reduces the workload of the shop clerk and also improves work efficiency.

If the stored printing data exists at the moment the tablet terminal 10 is mounted on the docking station 1, the effect that printing data exists is notified by displaying the guidance screen in FIG. 7, thereby guaranteeing that the shop clerk is indeed informed of a print job. The shop clerk who is informed of the print job can only touch the 'OK' key 102 in the guidance screen to start to print each printing data if the shop clerk desires to print the printing data immediately. The shop clerk can touch the 'later' key 103 to reserve the printing of each printing data if the shop clerk desires to print the printing data later.

The existence of each reserved printing data is notified again through the guidance screen in FIG. 7 every time a processing is ended so that the shop clerk can exactly master the rest printing data.

As each printing data is printed in the docking station mounted with the tablet terminal 10, the shop clerk can collect the printed paper quickly on the spot, not worrying the printed paper being left on the printer, which prevents the leakage of the content on the printed paper to a third party.

If docking stations 1 are arranged at a plurality of positions in a store, then a print job may be completed at the one of the plurality of positions where the shop clerk can carry out an operation easily, thus improving work efficiency.

Further, it is exemplified that a docking station 1 is provided with two printers in the aforementioned embodiment, however, the type or the number of the printers can be properly selected according to the type of a job.

The commodity sales data processing apparatus is generally transferred while a program such as a control program and the like is stored in a ROM. However, the present invention is not limited to this; a control program transferred independent from a computer may be written into a writable storage device provided in the computer according to the operation of a user. The commodity sales data processing apparatus may be transferred while the control program is recorded in a removable recording medium or is transferred through the communication via a communication network. The recording medium may be of any form as long as the recording medium can store programs like a CD-ROM and a memory card and is apparatus-readable. Further, the function achieved by an installed or downloaded program can also be realized by the cooperation with an OS (Operating System) in the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity sales data processing apparatus, comprising:
   a stationary type docking station provided with a printer; and
   a portable information terminal which is freely mounted on or separated from the docking station, wherein
   the information terminal comprises an input module configured to accept the input of the data related to the sales of a commodity;
   a processing module configured to process the data accepted by the input module;
   a first control module which, when a print job is designated, prints printing data using the printer if the information terminal is mounted on the docking station or stores the printing data if the information terminal is not mounted on the docking station;
   a notification module which, when the information terminal is mounted on the docking station, notifies an existence of the printing data if the printing data is stored; and
   a second control module configured to print the stored printing data using the printer if a print job is designated to be executed as a response to the notification of the notification module.

2. The commodity sales data processing apparatus according to claim 1, wherein
   the information terminal further comprises a detection module configured to detect the mounting of the information terminal on the docking station and the separation of the information terminal from the docking station, and
   the notification module is configured to notify an existence of the printing data if the printing data is stored when the detection module detects the mounting of the information terminal on the docking station.

3. The commodity sales data processing apparatus according to claim 2, wherein
   the information terminal further comprises a determination module configured to determine whether or not the stored printing data exists if the detection module detects the mounting of the information terminal on the docking station, and
   the notification module is configured to notify the effect that printing data exists if the determination result of the determination module is that the stored printing data exists.

4. The commodity sales data processing apparatus according to claim 1, wherein
   the notification module notifies the effect that printing data exists again after the processing of the processing module is ended if no print job is designated as a response to the notification.

5. The commodity sales data processing apparatus according to claim 1, wherein
   the printer is a plurality of types of printers, and
   the second control module selects any one of the printers according to the content of the stored printing data and prints the stored printing data using the selected printer.

6. A control method carried out by a commodity sales data processing apparatus comprising a stationary type docking station provided with a printer, a portable information terminal which is freely mounted on or separated from the docking station, including:
- accepting the input of the data related to the sales of a commodity;
- processing the accepted data;
- when a print job is designated, printing data using the printer if the information terminal is mounted on the docking station or storing the printing data if the information terminal is not mounted on the docking station;
- when the information terminal is mounted on the docking station, notifying an existence of the printing data if the printing data is stored; and
- printing the stored printing data using the printer if a print job is designated to be executed as a response to the notifying.

7. A commodity sales data processing apparatus, comprising:
- a stationary type docking station provided with a printer; and
- a portable information terminal which is freely mounted on or separated from the docking station, wherein
- the information terminal comprises an input module configured to accept the input of the data related to the sales of a commodity;
- a processing module configured to process the data accepted by the input module;
- a detection module configured to detect the mounting of the information terminal on the docking station and the separation of the information terminal from the docking station;
- a notification module configured to notify an existence of the printing data if the printing data is stored when the detection module detects the mounting of the information terminal on the docking station; and
- a control module prints the stored printing data using the printer if a print job is designated to be executed as a response to the notification of the notification module.

8. The commodity sales data processing apparatus according to claim 7, wherein
- the information terminal further comprises a determination module configured to determine whether or not the stored printing data exists if the detection module detects the mounting of the information terminal on the docking station, and
- the notification module configured to notify the effect that printing data exists if the determination result of the determination module is that the stored printing data exists.

9. The commodity sales data processing apparatus according to claim 7, wherein
- the notification module notifies the effect that printing data exists again after the processing of the processing module is ended if no print job is designated as a response to the notification.

10. The commodity sales data processing apparatus according to claim 7, wherein
- the printer is a plurality of types of printers, and
- the second control module selects any one of the printers according to the content of the stored printing data and prints the stored printing data using the selected printer.

* * * * *